(12) United States Patent
Maegawa

(10) Patent No.: US 7,927,721 B2
(45) Date of Patent: Apr. 19, 2011

(54) WINDOW GLASS FOR AUTOMOBILE

(75) Inventor: Tsuyoshi Maegawa, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 464 days.

(21) Appl. No.: 10/587,719

(22) PCT Filed: Jan. 27, 2005

(86) PCT No.: PCT/JP2005/001122
§ 371 (c)(1),
(2), (4) Date: Jul. 28, 2006

(87) PCT Pub. No.: WO2005/073143
PCT Pub. Date: Aug. 11, 2005

(65) Prior Publication Data
US 2007/0128446 A1    Jun. 7, 2007

(30) Foreign Application Priority Data
Jan. 30, 2004  (JP) ................................. 2004-022480

(51) Int. Cl.
*B32B 15/04* (2006.01)
(52) U.S. Cl. .......................... 428/701; 428/426; 428/702
(58) Field of Classification Search .................... 501/15, 501/17, 78, 79; 428/208, 328, 428, 434, 428/207, 690, 426, 701, 702; 427/165
See application file for complete search history.

(56) References Cited

U.S. PATENT DOCUMENTS

| 5,244,484 A | 9/1993 | Chiba et al. |
| 5,421,877 A | 6/1995 | Hayakawa et al. |
| 5,976,678 A * | 11/1999 | Kawazu et al. ................ 428/208 |
| 6,362,119 B1 * | 3/2002 | Chiba .............................. 501/15 |
| 2003/0119647 A1 * | 6/2003 | Sanichi et al. ................... 501/17 |

FOREIGN PATENT DOCUMENTS

| JP | 3-285844 | 12/1991 |
| JP | 6-183784 | 7/1994 |
| JP | 11-228177 | * 8/1999 |
| JP | 11-228184 | 8/1999 |
| JP | 2001-58849 | 3/2001 |
| JP | 2001-34447 | 12/2001 |

OTHER PUBLICATIONS

JP 11-228177 machine translation.*
Optel Vision, Cielab definition.*
Chinese Office Actions dated Apr. 3, 2009 respectively (Twelve (12) pages).

* cited by examiner

*Primary Examiner* — Jennifer C McNeil
*Assistant Examiner* — Lauren Robinson
(74) *Attorney, Agent, or Firm* — Crowell & Moring LLP

(57) ABSTRACT

The present invention relates, in an automotive window glass having a ceramic color layer formed thereon, to the automotive window glass being characterized in that a ceramic color layer is formed on an entire surface or part of the automotive window glass by using a ceramic color paste containing a green-color pigment in an amount of 30-80 wt % relative to 100 wt % of a total of a black-color pigment and the green-color pigment, and that, in an L*a*b* color system, a transmitted color of the glass has a value of a* of −10.0 to 0.0, and a reflected color of the ceramic color layer, which is observed from a vehicle exterior side through the glass has L*≦30.0, −10.0≦a*≦0, and −2≦b*≦8.

6 Claims, 1 Drawing Sheet

WINDOW GLASS FOR AUTOMOBILE

TECHNICAL FIELD

The present invention relates to a vehicle window glass coated with a paste formed of a ceramic color.

BACKGROUND OF THE INVENTION

Hitherto, there has been a spread of a so-called ceramic color paste for automotive window glass, which is obtained by forming a coating layer by screen printing of a paste (hereinafter referred to as ceramic color paste) formed of a ceramic color composition at an automotive window glass peripheral portion or central portion and its vicinity, then by drying, and then by baking during a bending treatment step. The ceramic color paste is baked to form a ceramic color layer.

A ceramic color layer as an opaque adhesive layer is formed by the ceramic color composition by coating a glass platy body peripheral portion or the like with the ceramic color paste and then baking. It is used for the purpose of, for example, preventing deterioration of an adhesive such as urethane sealant due to ultraviolet rays, or having a concealing function and the like to make heat ray terminals and the like not to be seen from outside.

Therefore, it is important for the ceramic color layer to have a function as an opaque colored layer and not to transmit visible light rays, particularly ultraviolet rays.

As ceramic color pastes for this use, as they are roughly classified, ones in which various heat resistant coloring pigments are mixed with one based on an amorphous glass or one based on a crystallized type and the like are known (see Patent Publication 1).

In order that the ceramic color layer does not transmit the visible light rays, particularly ultraviolet rays, it is general to use a ceramic color layer of black color or gray color (see Patent Publication 2).

The ceramic color layers of black color or gray color used hitherto have strong tones, become conspicuous too much between glass color and body color, decouple glass color and body color, and have a tendency of generating uncomfortable feeling. Furthermore, since it is formed for the purpose of concealing trim members from vehicle exterior, the ceramic color layer was widely formed and had a tendency that an uncomfortable feeling was also strongly sensed. In recent years, in view of such problem, a ceramic color layer having a gradation by a fine dot pattern has been used, but it was not sufficient for eliminating an uncomfortable feeling.

Patent Publication 1: Japanese Patent Laid-open Publication 3-285844
Patent Publication 2: Japanese Patent Laid-open Publication 6-183784

SUMMARY OF THE INVENTION

It is an object of the present invention to provide an automotive window glass that is superior in external appearance, in which a ceramic color layer applied to glass does not have an uncomfortable feeling.

According to the present invention, there is provided, in an automotive window glass having a ceramic color layer formed thereon, the automotive window glass being characterized in that a ceramic color layer is formed on an entire surface or part of the automotive window glass by using a ceramic color paste containing a green-color pigment in an amount of 30-80 wt % relative to 100 wt % of a total of a black-color pigment and the green-color pigment, and that, in an $L^*a^*b^*$ color system, a transmitted color of the glass has a value of $a^*$ of $-10.0$ to $0.0$, and a reflected color of the ceramic color layer, which is observed from a vehicle exterior side through the glass has $L^*\leqq30.0$, $-10.0\leqq a^*\leqq0$, and $-2\leqq b^*\leqq8$.

DETAILED DESCRIPTION

Figure 1:
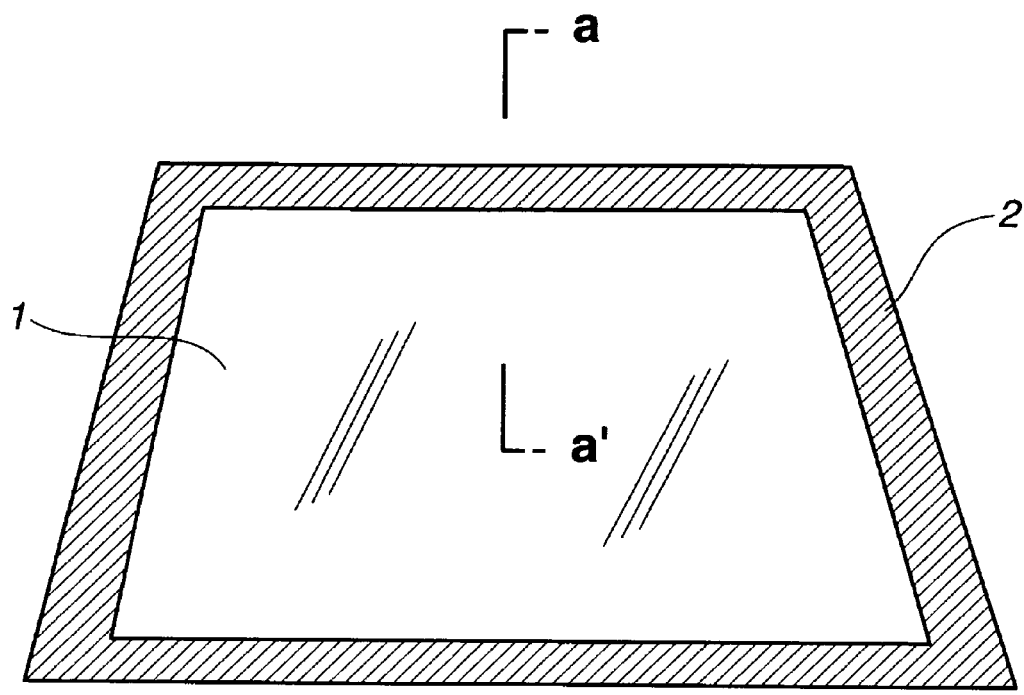
FIG. 1 is a front schematic view of a glass, on which a ceramic color layer according to each of Examples 1-5 and Comparative Examples 1-6 is formed.

In the present invention, a ceramic color layer is formed on a glass used for an automotive window. For example, FIG. 1 shows an automotive window glass 1 on which a ceramic color layer 2 according to the present invention is formed.

The ceramic color layer 2 is formed in a condition that the ceramic color layer 2 is strongly attached to the glass, by printing a ceramic color paste formed of a low-melting-point glass frit and a pigment onto the glass by screen printing or the like to have a predetermined shape, and by baking the ceramic color paste after the printing.

The ceramic color layer 2 is formed for the purpose of preventing light from deteriorating an adhesive (e.g., urethane series adhesive) used for adhering the glass to the vehicle body. With this, it is preferable that the visible light transmittance of the ceramic color layer is 0.3% or lower and that the ultraviolet transmittance is 0.1% or lower.

In a balance between the color of the automotive window glass and the color of the ceramic color layer, the transmitted color of the glass and the reflected color of the ceramic color layer cause a problem. This is because, when the glass is observed from vehicle exterior, the glass color is a transmitted color, and the color of the ceramic color layer is a reflected color observed through the glass.

The glass is used for an automotive window. In recent years, an automotive window glass that has UV cutting (ultraviolet cutting) and infrared cutting capability is often used for the purpose of providing comfortableness of the vehicle interior space. The color tone of this glass that cuts ultraviolet rays and infrared rays is green color.

In $L^*a^*b^*$ color system, the value of $L^*$ represents brightness, the value of $a^*$ represents intensity of red in + and intensity of green in −, and the value of $b^*$ represents intensity of yellow in + and intensity of blue in −.

In a green-color glass that cuts ultraviolet rays and infrared rays, the value of $a^*$ of the transmitted color is in a range of $-15.0$ to $0.0$.

To a glass having such color tone, it is preferable to use a mixture of a black-color pigment and a green-color pigment, as a pigment used for the ceramic color paste.

As the black-color pigment, it is possible to use chromium oxide, copper oxide, manganese oxide or the like. As the green-color pigment, it is possible to use chromium oxide.

In the mixing of the green-color pigment and the black-color pigment, it is preferable that the green-color pigment is in 30 to 80 wt % relative to 100 wt % of the total of the pigments. It is more preferably in 60 to 80 wt %, since the green color becomes intense.

It is preferable in $L^*a^*b^*$ color system that the reflected color of the ceramic color layer that is observed from the vehicle exterior side has L*≦30.0. If L* exceeds 30, the ceramic color layer becomes too bright and conspicuous. It is therefore not preferable.

It is preferable that the value of a* of the reflected color of the ceramic color layer that is observed from the vehicle exterior side is in a range of −10.0≦a*≦0. If it is a value less than −10.0, green color is sensed intensely. If it is greater than 0, the color tone of red color is sensed. Therefore, the case in which it is not in a range of −10.0≦a*≦0 is not preferable.

the ultraviolet ray transmittance were measured by Hitachi spectrophotometer U4000.

In Table 1, there are shown the colors of the pigments used, the color tones of the ceramic color layers, the values of L*, the values of a* and the values of b* of the ceramic color layers in L*a*b* color system and the values of the visible light ray transmittance and the ultraviolet ray transmittance. The numerical values of the pigments of Table 1 are values of component ratios of respective pigments expressed in wt % in case that the amount of the pigment is in 100 wt %.

TABLE 1

|  | Pigment wt % | Color Tone | L* | a* | b* | Visible Light Transmittance | Ultraviolet Transmittance |
|---|---|---|---|---|---|---|---|
| Example 1 | Black 70:Green 30 | Black Green | 22.5 | −0.63 | −1.11 | 0.0% | 0.0% |
| Example 2 | Black 40:Green 60 | Deep Green | 24.4 | −3.46 | 2.14 | 0.0% | 0.0% |
| Example 3 | Black 35:Green 65 | Deep Green | 24.7 | −3.71 | 2.37 | 0.0% | 0.0% |
| Example 4 | Black 30:Green 70 | Deep Green | 25.3 | −4.46 | 2.83 | 0.0% | 0.0% |
| Example 5 | Black 20:Green 80 | Deep Green | 26.9 | −5.92 | 3.15 | 0.0% | 0.0% |
| Com. Ex. 1 | Black 100 | Black | 21.2 | 0.5 | −0.96 | 0.0% | 0.0% |
| Com. Ex. 2 | Black 70:Blue 15:Green 15 | Black Blue Green | 23 | −0.56 | −2.81 | 0.0% | 0.0% |
| Com. Ex. 3 | Green 100 | Green | 33.8 | −21.2 | 7.85 | 1.5% | 0.1% |
| Com. Ex. 4 | Blue 100 | Blue | 26.4 | −4.45 | −12.5 | 1.7% | 1.7% |
| Com. Ex. 5 | Yellow 100 | Yellow | 45.3 | 6.7 | 29 | 6.8% | 0.1% |
| Com. Ex. 6 | Red 100 | Red | 26.8 | 13.8 | 5.8 | 0.3% | 0.1% |

Furthermore, it is preferable that the value of b* of the reflected color of the ceramic color layer that is observed from the vehicle exterior side is in a range of −2≦b*≦8. In case that the value of b* is less than −2, blue color is sensed intensely. If it exceeds 8, yellow color is sensed intensely, and that does not become a preferable color tone.

Although the low-melting-point glass frit used for a ceramic color paste is not particularly limited, it is possible to use glasses such as amorphous ones, crystalline ones, lead-free ones, and leaded ones.

The following non-limitative examples are illustrative of the present invention.

EXAMPLES 1-5 AND COMPARATIVE EXAMPLES 1-6

In each example and each comparative example, as shown in FIG. 1, a beltlike ceramic color layer 2 having a width of about 100 mm was formed on a glass 1 having a height of about 100 mm, a width of about 1450 mm, and a thickness of 3.5 mm.

The ceramic color paste was applied by screen printing, followed by drying in a drying furnace at 120° C. for 5 minutes, and then baking in a baking furnace at 650° C. for 3 minutes.

As the ceramic color paste, there was used one in which the ratio of the low-melting-point glass frit to the pigment was adjusted to 80:20, followed by addition of 5 wt % of a resin portion and 15 wt % of solvent to make 100 wt %. A pigment composition was prepared, as shown in Table 1.

As pigments used in examples and comparative examples, a mixed pigment of chromium oxide, copper oxide and manganese oxide was used as a black-color pigment; cobalt oxide as a blue-color pigment; chromium oxide as a green-color pigment; a mixed pigment of chromium oxide, titanium oxide and antimony oxide as a yellow-color pigment; and iron oxide as a red-color pigment.

Figure 2:
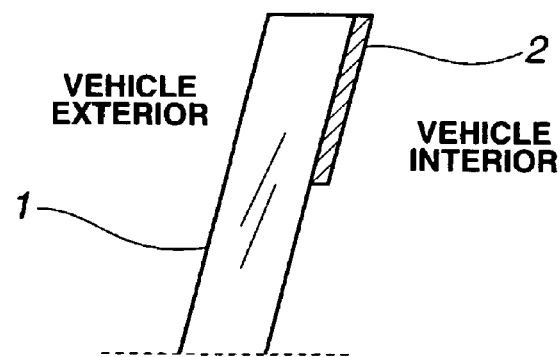
FIG. 2 is an a-a' sectional view of FIG. 1.

The reflected color was measured through the glass surface (from the vehicle exterior side in FIG. 2) by using MINOLTA calorimeter CR-300. The visible light ray transmittance and As shown in Examples 1-5 of Table 1, the color tones of the ceramic color layers became deep green colors by adjusting the green-color pigment to 30-80 wt % relative to 100 wt % of the pigment and by using a black-color pigment for the remainder, thereby forming ceramic color paste layers free of uncomfortable feeling In Comparative Example 1, it was a conventional ceramic color paste layer using a black-color pigment, and the black color of the color tone was intense to cause uncomfortable feeling.

One of Comparative Example 2 using a blue-color pigment in addition to black-color and green-color pigments caused a sense of blue color and uncomfortable feeling.

The ceramic color layer (Comparative Example 3) formed by using only the green-color pigment had an intense color tone of green-color of the ceramic color layer relative to the color of glass. The red-color ceramic color layer (Comparative Example 6) was in a complementary color relation to green color, had a color tone that was more conspicuous than that of the black-color ceramic color layer (Comparative Example 1), and was one of rather uncomfortable feeling.

The ceramic color layer (Comparative Example 4) obtained by using only the blue-color pigment and the ceramic color layer (Comparative Example 5) obtained by using only the yellow-color pigment could not satisfy 0.3% or less of the visible light ray transmittance and 0.1% or less of the ultraviolet ray transmittance.

The invention claimed is:

1. In an automotive window glass having a ceramic color layer formed thereon, the automotive window glass being characterized in that:
   a ceramic color layer is formed on an entire surface or part of the automotive window glass by using a ceramic color paste containing a green-color pigment and a black-color pigment;
   the green color-pigment is present in an amount of 60-80 wt % relative to 100 wt % of a total of the black-color pigment and the green-color pigment;
   in an L*a*b* color system, the glass has a transmitted color value of a* of −10.0 to 0.0, and the ceramic color layer, observed from a vehicle exterior side through the glass, has reflected color values of $L^* \leqq 30.0$, $-10.0 \leqq a^* \leqq 0$, and $-2 \leqq b^* \leqq 8$;

the visible light transmittance of the ceramic layer is 0.3% or lower, and the ultraviolet light transmittance of the ceramic layer is 0.1% or lower.

2. An automotive window glass according to claim 1, which is characterized in that the ceramic color paste comprises a low-melting-point glass frit and a pigment.

3. An automotive window glass according to claim 2, which is characterized in that a ratio of the low-melting-point glass frit to the pigment is about 80:20.

4. An automotive window glass according to claim 1, which is characterized in that the black-color pigment comprises a mixture of chromium oxide, copper oxide and manganese oxide.

5. An automotive window glass according to claim 1, which is characterized in that the green-color pigment comprises chromium oxide.

6. An automotive window glass according to claim 1, which is characterized in that a pigment component of the ceramic color layer consists of the black-color pigment and the green-color pigment.

* * * * *